United States Patent
Takahashi et al.

(10) Patent No.: US 12,183,478 B2
(45) Date of Patent: Dec. 31, 2024

(54) TREATMENT METHOD OF COATED WIRE

(71) Applicant: MITSUBISHI MATERIALS CORPORATION, Tokyo (JP)

(72) Inventors: Kenshi Takahashi, Iwaki (JP); Shu Muraoka, Kagawa-gun (JP); Hiroshi Hayashi, Tokyo (JP)

(73) Assignee: MITSUBISHI MATERIALS CORPORATION, Tokyo (JP)

( * ) Notice: Subject to any disclaimer, the term of this patent is extended or adjusted under 35 U.S.C. 154(b) by 758 days.

(21) Appl. No.: 17/281,052

(22) PCT Filed: Oct. 18, 2019

(86) PCT No.: PCT/JP2019/041039
§ 371 (c)(1),
(2) Date: Mar. 29, 2021

(87) PCT Pub. No.: WO2020/080509
PCT Pub. Date: Apr. 23, 2020

(65) Prior Publication Data
US 2021/0343453 A1    Nov. 4, 2021

(30) Foreign Application Priority Data
Oct. 19, 2018 (JP) ................. 2018-197748

(51) Int. Cl.
*H01B 15/00* (2006.01)
*H02G 1/12* (2006.01)

(52) U.S. Cl.
CPC ......... *H01B 15/003* (2013.01); *H01B 15/008* (2013.01); *H02G 1/1275* (2013.01)

(58) Field of Classification Search
CPC .. H01B 15/003; H01B 15/008; H02G 1/1275; H01L 21/02079; C22B 15/00; C22B 15/0056; C22B 15/006; C23G 1/00; Y02P 10/20; Y02W 30/82
USPC ........ 75/403, 638, 715; 134/2; 148/210, 223
See application file for complete search history.

(56) References Cited

U.S. PATENT DOCUMENTS

2013/0081515 A1*  4/2013  Okano ................. C22B 15/00
                                                  75/403

FOREIGN PATENT DOCUMENTS

| CN | 101404194 A  | 4/2009 |
| CN | 102149526 A  | 8/2011 |
| CN | 202940070 U  | 5/2013 |
| CN | 105469906 A  | 4/2016 |
| JP | S61-143529 A | 7/1986 |
| JP | H10-025523 A | 1/1998 |

(Continued)

OTHER PUBLICATIONS

Ajisaka, Machine Translation of WO2014020958A1, generated Nov. 2, 2023 (Year: 2014).*

(Continued)

*Primary Examiner* — Philip C Tucker
*Assistant Examiner* — Andrew L Swanson
(74) *Attorney, Agent, or Firm* — Locke Lord LLP; James E. Armstrong, IV; Nicholas J. DiCeglie, Jr.

(57) ABSTRACT

In this treatment method of a coated wire, a coated wire, which is a metal wire coated with a resin, is subjected to low-temperature heating in a non-combustion atmosphere in coexistence with an alkali to embrittle the coating resin, the embrittled coating resin is crushed, and the coating resin and the metal wire are separated.

4 Claims, 2 Drawing Sheets

(56) References Cited

FOREIGN PATENT DOCUMENTS

| | | |
|---|---|---|
| JP | H11-128899 A | 5/1999 |
| JP | 11306885 A | 11/1999 |
| JP | 3002731 B | 1/2000 |
| JP | 2009-249665 A | 10/2009 |
| JP | 2011-174175 A | 9/2011 |
| JP | 2011-184673 A | 9/2011 |
| JP | 2012-089358 A | 5/2012 |
| JP | 5134719 B1 | 1/2013 |
| JP | 2013-076121 A | 4/2013 |
| JP | 2014-069137 A | 4/2014 |
| JP | 2017-061584 A | 3/2017 |
| TW | 201530568 A | 8/2015 |
| WO | WO-2014020958 A1 * | 2/2014 ............ B01D 53/68 |

OTHER PUBLICATIONS

International Search Report mailed Dec. 10, 2019, issued for PCT/JP2019/041039 and English translation thereof.
Notification of the First Office Action mailed Apr. 24, 2022, issued for Chinese Patent Application No. 201980064164.1 and English translation thereof.
Office Action mailed Nov. 21, 2022, issued for Taiwanese Patent Application No. 108137585 and English translation of the Search Report.
Office Action issued in Malaysian Patent Application No. PI2021001702, mailed Feb. 16, 2024, with English translation.
Office Action mailed Jun. 30, 2023, issued for Japanese Patent Application No. 2019-189875 and English translation thereof.

* cited by examiner

TREATMENT METHOD OF COATED WIRE

TECHNICAL FIELD

The present invention relates to a method for efficiently separating a metal wire and a coating resin from a coated wire. More specifically, the present invention relates to a method in which a coated wire is subjected to a heat treatment under comparatively mild conditions of approximately 200° C. in coexistence with an alkali to embrittle the coating resin and easily separate the resin and the metal wire.

This application claims priority based on Japanese Patent Application No. 2018-197748 filed in Japan on Oct. 19, 2018, the contents of which are incorporated herein by reference.

BACKGROUND ART

Coated wires have a form in which a metal wire, which is a conductor, is covered with an insulating resin coating material such as a vinyl chloride resin, and are widely used as basic constituent members of various electric devices such as electric parts of automobiles, home appliances, communication devices, and computers. A large amount of waste coated wire is generated by the disposal of these various electric devices. Since a copper wire or the like is used as the metal wire of the conductor for the coated wire, metal wire such as copper wire is recovered from the waste coated wire and recycled. However, in coated wires, a resin coating material adheres to and covers the periphery of the metal wire, thus, it is necessary to separate the metal wire and the coating resin in order to recover and recycle the metal wire.

The following methods are known in the related art as treatment methods of a coated wire.

A method in which a coated wire is finely sheared to peel a coating resin from a copper wire and then the cut ultrafine copper wire and the coating resin are separated by wet specific gravity to recover the copper wire (Patent Document 1).

A method of combusting a coating resin and mechanically removing the combusted residue to recover a copper wire (Patent Document 2).

A method in which a coated wire is heat-treated in a non-oxidizing atmosphere to carbonize a coating resin and this carbide is separated to recover a copper wire (Patent Document 3).

CITATION LIST

Patent Document

[Patent Document 1]
Japanese Unexamined Patent Application, First Publication No. 2012-089358
[Patent Document 2]
Japanese Unexamined Patent Application, First Publication No. S61-143529
[Patent Document 3]
Japanese Patent No. 05134719

SUMMARY OF INVENTION

Technical Problem

In the treatment method of Patent Document 1, the metal wire and the coating resin are separated by wet specific gravity after finely shearing the coated wire. Since this method is a method of physically peeling a coating resin from a metal wire by mechanical pressure when shearing the coated wire, it is necessary to cut the coated wire extremely finely. In addition, since fine pieces of coating resin tend to remain on the metal wire, there is a problem in that the quality of the metal is deteriorated.

Furthermore, it is necessary to carry out fine cutting in order to reliably separate the coating resin from the metal wire, thus, blades of a crushing device are easily damaged and the crushing time is lengthened, such that there is a problem in that the treatment efficiency is inferior.

In the treatment method of Patent Document 2, since the coating resin is combusted so as to be removed, it is possible to take off the coating resin almost completely, but since heating is performed in an oxidizing atmosphere, some of the metal of the conductor is oxidized and there is a problem in that the metal quality deteriorates. In addition, since corrosive hydrogen chloride gas is generated by the thermal decomposition of the vinyl chloride resin included in the coating resin, there is a problem in that the treatment apparatus and the piping are easily corroded and the exhaust gas treatment becomes complicated. In addition, there is a concern that harmful dioxins may be generated.

In the treatment method of Patent Document 3, in order to suppress the generation of dioxins, the coated wire is heated in oil or under conditions in which there is no oxygen to carbonize the coating resin. Oxidation of the metal wire of the coated wire is prevented.

However, when the coated wire is heated in oil, there is a problem in that the oil attaches to the surface of the metal wire and the metal quality deteriorates and there is a problem in that the carbonization of the coating resin becomes insufficient with heating under non-oxygen conditions. In addition, in the treatment method of Patent Document 3, it is shown that due to the coexistence of an alkaline substance in the oil, generated hydrogen chloride and the like are removed to reduce the residual chlorine concentration and shorten the heating time; however, the problems of heating in oil described above are not solved. In addition, in a case where the coated wire is heated in oil or under non-oxygen conditions to carbonize the coating resin, the steps are lengthened and the economic efficiency is often impaired.

Solution to Problem

The present invention solves the problems described above of the treatment methods of the related art and provides a method for separating a metal wire and a coating resin more efficiently and in a shorter time than methods of the related art, in which the metal wire and the coating resin are not peeled by shearing the coated wire and the coating resin is not combusted using a heat treatment in a non-combustion atmosphere.

The present invention is a treatment method of a coated wire having the following configurations.

(1) A treatment method of a coated wire, the method including subjecting a coated wire, in which a metal wire is coated with a resin, to low-temperature heating in a non-combustion atmosphere in coexistence with an alkali to embrittle the coating resin, crushing the embrittled coating resin, and separating the coating resin and the metal wire.

(2) The treatment method of a coated wire according to (1) described above, in which the non-combustion atmosphere is a superheated steam atmosphere, a nitrogen atmosphere, a carbon dioxide gas atmosphere, a mixed atmosphere thereof, or an air atmosphere, and a temperature of the low-temperature heating is 180° C. to 270° C.

(3) The treatment method of a coated wire according to (1) or (2) described above, in which the low-temperature heating and crushing of the coated wire are performed simultaneously.

(4) The treatment method of a coated wire according to any one of (1) to (3) described above, in which, using a heating furnace having a crushing member in the furnace, the coated wire is subjected to low-temperature heating at 180° C. to 270° C. in a non-combustion atmosphere to simultaneously embrittle and crush the coating resin.

Advantageous Effects of Invention

In the treatment method of a coated wire of the present invention, it is possible to efficiently embrittle a coating resin by a heat treatment in coexistence with an alkali and to suppress the generation of corrosive hydrogen chloride gas and dioxins.

In addition, since the treatment method of the present invention is a low-temperature heat treatment in a non-combustion atmosphere, it is possible to recover a metal, such as copper, used as a metal wire of a coated wire without oxidation and to increase the quality of the recovered metal.

Furthermore, since the treatment method of the present invention is a low-temperature heat treatment, the amount of gas generated is small, the exhaust gas treatment is easy, and it is possible to reduce fuel costs. In addition, it is possible to effectively use the recovered coating resin as a fuel substitute or the like.

In addition, in a method of heating at a low temperature while applying a physical impact with a crushing member, it is possible to carry out the treatment in a shorter time and at a lower cost.

DESCRIPTION OF EMBODIMENTS

A specific description will be given below of embodiments of the treatment method of a coated wire of the present invention.

Figure 1:
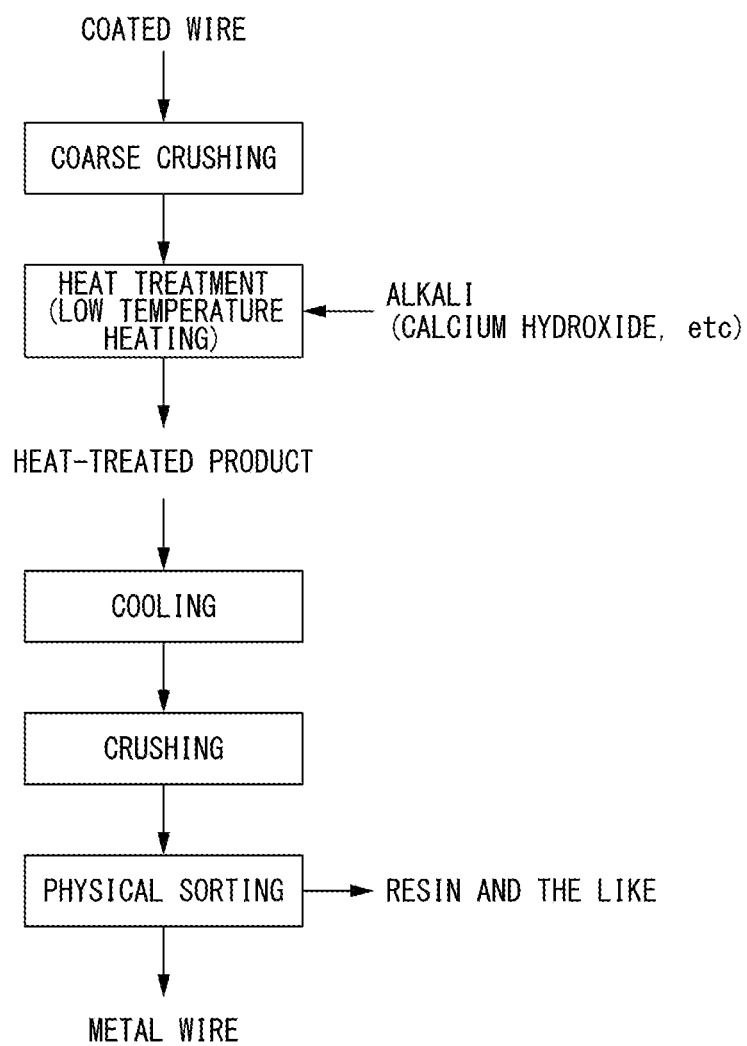
FIG. 1 is a schematic step diagram of a treatment method of a coated wire of the present embodiment.

The present embodiment relates to a treatment method of a coated wire, in which a metal wire is coated with a resin, and heats the coated wire at a low temperature in a non-combustion atmosphere in coexistence with an alkali to embrittle the coating resin, crushes the embrittled coating resin, and separates the coating resin and the metal wire. The schematics of the treatment method of the present embodiment are shown in FIG. 1.

Here, the non-combustion atmosphere may be rephrased as non-combustion conditions.

In general, a coated wire is formed by coating an insulating resin such as a vinyl chloride resin or a polyethylene resin on a metal wire such as a copper wire. It is possible to widely apply the treatment method of the present embodiment to typical coated wires. Coated wires may be treated by being coarsely crushed.

In coarse crushing, the coated wire may be crushed with a biaxial crusher or the like such that the long side of the coated wire is 10 cm or less.

In the treatment method of the present embodiment, the coated wire and the alkali coexist and the coated wire is subjected to low-temperature heating in a non-combustion atmosphere to embrittle the coating resin. It is possible to efficiently embrittle the coating resin due to the coexistence of the alkali with the coated wire. It is considered that this is because plasticizers included in the coating resin are decomposed by the alkali to promote the embrittlement of the resin. In addition, it is possible for the alkali to capture hydrogen chloride (HCl) generated by thermal decomposition of a vinyl chloride resin or the like as a coating resin and to significantly reduce the amount of hydrogen chloride included in the exhaust gas. Furthermore, since the alkali physically adsorbs the tar generated by the alteration of the resin, it is possible to suppress clogging of the pipe and agglomeration of the treated product due to the tar.

As the alkali, for example, it is possible to use hydroxides, oxides, or carbonates of alkaline earth metals, or mixtures thereof. Specifically, it is possible to use calcium hydroxide, calcium oxide, calcium carbonate, and the like. In addition, it is possible to use fly ash from the incineration of municipal waste, soot dust from incineration of industrial waste, and hydroxide obtained by desalting and cleaning dust recovered by a chlorine bypass system of a cement factory by water cleaning, or the like, and, in addition, it is possible to use mixtures thereof.

Examples of the most preferable alkalis include calcium hydroxide, which has strong resin embrittlement and hydrogen chloride gas-capturing effects, and when a mixture is used, a mixture containing abundant calcium hydroxide is preferable.

The alkali may be powder, a suspension, or an aqueous solution.

The amount of alkali added may be approximately 1/5 by weight to approximately 2/3 by weight of the coated wire, and more preferably 1/5 by weight to 1/3 by weight.

The treatment method of the present embodiment is a method of embrittling the coating resin without combusting, therefore, the coated wire is subjected to low-temperature heating in a non-combustion atmosphere in coexistence with an alkali. The non-combustion atmosphere is a superheated steam atmosphere, a nitrogen atmosphere, a carbon dioxide gas atmosphere, or a mixed atmosphere thereof, and may be an air atmosphere as long as the coating resin does not combust at the heating temperature.

The superheated steam atmosphere, nitrogen atmosphere, carbon dioxide gas atmosphere, and mixed atmospheres thereof are non-oxidizing atmospheres, in which the oxidation of metal wires is suppressed, which is preferable.

Superheated steam is the most effective for resin embrittlement. In addition, superheated steam has a high specific heat and temperature control is easy, which is preferable.

In the treatment method of the present embodiment, the temperature of the low-temperature heating is preferably 180° C. or higher and 270° C. or lower, and more preferably 200° C. or higher and 250° C. or lower. If the heating temperature is lower than 180° C., the embrittlement of the coating resin does not proceed sufficiently. On the other hand, when the heating temperature exceeds 270° C., the amount of pyrolysis gas generated in the coating resin increases, thus, the exhaust gas treatment becomes complicated and operating costs increase, which is not preferable.

In the treatment method of the present embodiment, with low-temperature heating in the above temperature range, a vinyl chloride resin and the like are not decomposed. In addition, there is almost no oxidation of the metal. Furthermore, since the heating temperature is low, it is possible to reduce the operating costs. It is possible to use waste heat of a factory as a heat source.

As a heating device, it is possible to use a batch type stationary furnace, a continuous type heating furnace such as a rotary kiln, or the like. The heating time may be, for example, approximately 50 to 90 minutes for a treatment amount (coated wire+alkali) of 2 kg.

The heated treated product is cooled to room temperature and crushed. Since the coating resin is cured by cooling after the heat treatment, it is possible to easily carry out the crushing. The crushing method may be shear crushing, impact crushing, or both. As a crusher, it is possible to use a shear crusher (a uniaxial crusher, a biaxial crusher, or a cutter mill), an impact crusher (a hammer crusher, a ball mill, or a rod mill), or the like. The embrittled resin is finely crushed by this crushing treatment, thus, easy separation from the metal wire is possible.

Since the crushing treatment obtains an elongated metal wire and fine resin particles, it is possible to easily carry out separation into a metal wire and a resin component by physical sorting such as sieving or specific gravity sorting.

As a specific gravity sorter, it is possible to use a dry specific gravity sorter (a blown air sorter or an air table) or the like, a wet specific gravity sorter (a thin flow sorting apparatus, a sink-float sorting apparatus, or the like) or the like.

In the treatment method of the present embodiment, the low-temperature heating (embrittlement of the resin) and crushing of the coated wire may be performed simultaneously. For example, using a heating furnace having a crushing member in the furnace, when the coated wire is subjected to low-temperature heating at 180° C. to 270° C. in a non-combustion atmosphere, heating is carried out while applying mechanical impacts to the coated wire. In such a treatment method, the embrittlement and crushing of the coating resin proceed simultaneously, thus, it is possible to perform the treatment in a short time and at low cost.

As a member for applying an impact to the coated wire, for example, a crushing member such as a ball or a rod may be put in the furnace of a heating furnace such as a rotary kiln. As the material of the crushing member, ceramics or a metal such as iron or SUS may be used. Since such a crushing member promotes heat conduction to the coated wire, it is possible to efficiently promote the embrittlement of the coating resin. In addition, when a lifter or a stirring blade is provided in the retort of the rotary kiln, the crushing member flows more and crushing is promoted, which is more preferable. When the coated wire is rotated together with the retort of the rotary kiln and is crushed by being repeatedly dropped under its own weight, the impact is applied by the dropping, thus, it is not necessary to put a crushing member in the furnace.

Figure 2:
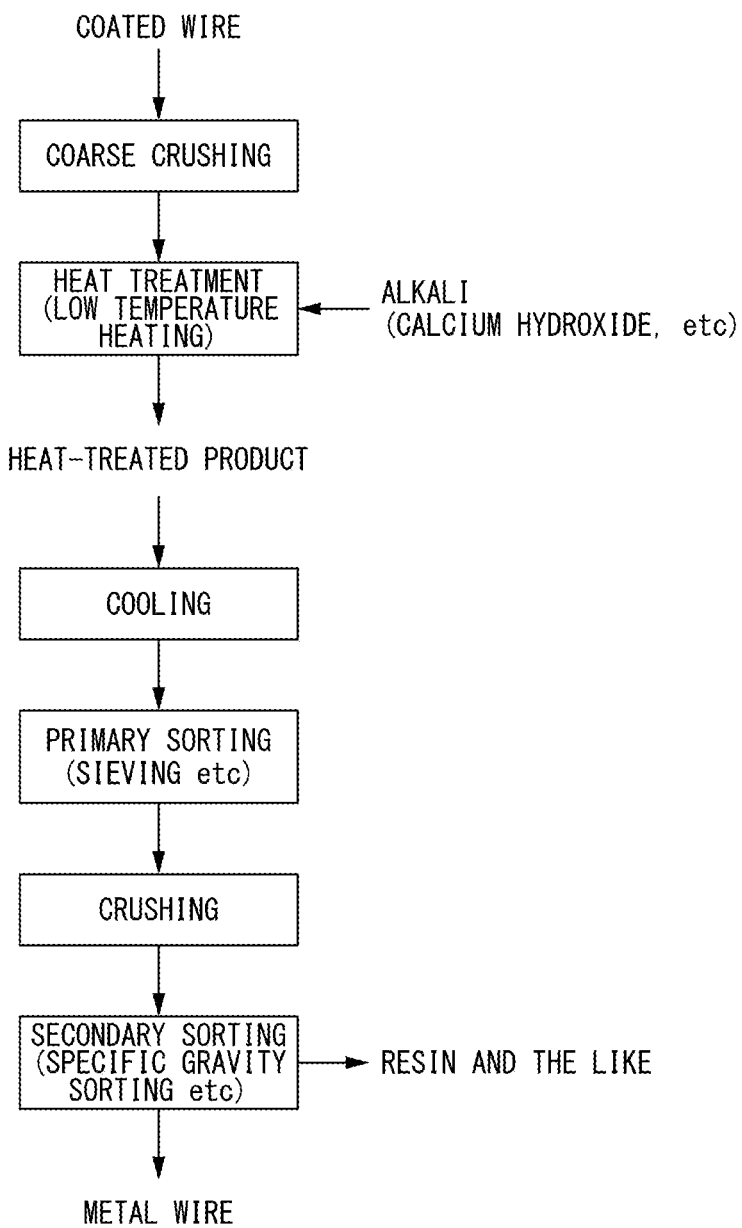
FIG. 2 is a schematic step diagram of the treatment method of a coated wire of the present embodiment in which heating and crushing are performed simultaneously.

As shown in FIG. 2, the crushed product which was simultaneously heated and crushed may be taken out from the furnace, cooled, and subjected to primary sorting such as sieving to take out alkaline residues and then secondary crushing may be performed and the secondary crushed product may be sorted into a resin component and a metal component by performing secondary sorting such as specific gravity sorting. Performing such secondary crushing and secondary sorting makes it possible to increase the sorting effect. In addition, since heating and crushing were already performed simultaneously, it is possible to perform the secondary crushing in a short time. The crushing method may be shear crushing, impact crushing, or both. As the crusher, it is possible to use a shear crusher (a uniaxial crusher, a biaxial crusher, or a cutter mill), an impact crusher (a hammer crusher or an impact crusher), or the like.

In the treatment method of the present embodiment, the coated wire is subjected to low-temperature heating in coexistence with an alkali to promote embrittlement of the resin by the alkali without combusting the coating resin, thus, no exhaust gas is generated or the amount of exhaust gas is extremely small, therefore, exhaust gas treatment at a subsequent stage becomes easy. Specifically, according to the treatment method of the present embodiment, it is possible to suppress the resin volatilization rate after the heat treatment to, for example, 10% or lower.

As shown in Equation [1], a resin volatilization rate (X) is a weight ratio of a difference (A-B) between a resin weight (B) recovered after the heat treatment and a resin weight (A) before the treatment, with respect to the resin weight (A) of the coated wire before the heat treatment.

$$X=\{(A-B)/A\}\times 100\% \qquad [1]$$

Since the metal of the coated wire does not volatilize due to the low-temperature heating, it is possible to ascertain the resin volatilization rate from the weight reduction rate of the coated wire. Specifically, as shown in Equation [2], a weight reduction rate (Z) of the coated wire is a weight ratio of a difference (C–D) between a weight (D) of the heat-treated product recovered after the heat treatment and a weight (C) before the treatment, with respect to the weight (C) of the coated wire before the heat treatment, which is equal to the resin volatilization rate (X).

$$Z=\{(C-D)/C\}\times 100\% \qquad [2]$$

According to the treatment method of the present embodiment, for example, it is possible to increase the resin-peeling rate to 80% or higher. As shown in Equation [3], a resin-peeling rate (Y) is the weight ratio of a resin weight (M) recovered after physical sorting with respect to a resin weight (L) of the coated wire after the heat treatment.

$$Y=(M/L)\times 100\% \qquad [3]$$

In order to obtain a sufficient resin peeling effect, the resin-peeling rate is preferably 80% or higher, and more preferably 85% or higher.

Example 1

A coated wire (a copper wire coated with a vinyl chloride resin: copper wire diameter: approximately 0.2 mm to 0.3 mm, coated wire diameter: approximately 1.0 mm to 3.0 mm) was placed into a biaxial crusher and coarsely crushed to have a long side of approximately 5 cm or less. Calcium hydroxide [Ca (OH)$_2$] was added to the coarsely crushed coated wire as an alkali, placed in a heating furnace, and heated to 180° C. to 250° C. for 60 minutes in a superheated steam atmosphere. After heating, the result was taken out from the furnace and cooled to room temperature, then placed in a ball mill and crushed, and the crushed product was sieved and sorted by specific gravity to be separated into a copper wire and resin particles. The results are shown in Table 1.

The resin-peeling rate (Y) in the table is a value obtained by Equation [3].

The resin weight (L) of the coated wire after the heat treatment was determined by subtracting the copper wire weight determined by the copper wire diameter from the weight of the coated wire after the heat treatment measured using an electronic balance.

The resin weight (M) recovered after physical sorting was measured using an electronic balance.

In addition, the resin volatilization rate (X) in the table is a value obtained by Equation [1].

The resin weight (A) of the coated wire before the heat treatment was determined by subtracting the copper wire weight determined by the copper wire diameter from the weight of the coated wire before the heat treatment measured using an electronic balance.

The resin weight (B) recovered after the heat treatment is the same as the resin weight (L) of the coated wire after the heat treatment.

As shown in Nos. 1 to 6 of Table 1, when the coated wire to which calcium hydroxide was added was heat-treated to 180° C. to 250° C. in a non-combustion atmosphere, the resin-peeling rate was 81% to 98% and it was possible to peel off the majority of the coating resin. In addition, the resin volatilization rate is 10% or lower and the loss of the resin due to the generation of pyrolysis gas is small. In order to obtain a sufficient peeling effect for the resin, the resin-peeling rate is preferably 80% or higher, and in order to suppress the amount of pyrolysis gas of the resin, the resin volatilization rate is preferably 10% or lower.

In addition, as shown in Nos. 4 and 5 of Table 1, it is possible to sufficiently separate the coating resin by adding ⅕ by weight to ⅔ by weight of calcium hydroxide to the coated wire. In addition, as shown in No. 6, it is possible to sufficiently separate the coating resin even in a case of being heated in a nitrogen atmosphere.

On the other hand, as shown in No. 7 of Table 1, when the heating temperature is 150° C., the resin-peeling rate is very low at 12% and the resin does not peel sufficiently. In addition, as shown in No. 8, when the heating temperature is 300° C., the resin volatilization rate is 15% and the amount of pyrolysis gas generated is large, thus, the resin loss is large.

On the other hand, as shown in No. 9, when heating is carried out under superheated steam without adding calcium hydroxide, the resin-peeling rate is 53% and the resin does not peel off sufficiently.

As described above, the resin-peeling rate of Nos. 1 to 6 is approximately 1.5 to approximately 1.8 times the resin-peeling rate of No. 9 and it is possible to significantly promote the peeling of the coating resin due to coexistence with an alkali in the low-temperature heating.

Example 2

As a coated wire, an automobile wire harness (copper wire diameter: approximately 0.2 mm to 0.3 mm, automobile wire harness wire diameter: approximately 1.0 mm to 3.0 mm) (below, WH) which was coarsely crushed with a biaxial crusher to have a long side of approximately 5 cm or less was used.

After putting 1.5 kg of the WH, 0.5 kg of calcium hydroxide [Ca(OH)$_2$] as an alkali, and SUS balls (φ25 mm, 60 pieces) as a crushing member into a batch type rotary kiln, a heat treatment was performed with a heating temperature of 220° C. in a superheated steam atmosphere. After heating for a predetermined time (60 min), the temperature was cooled to 80° C. or lower and the heat-treated product was taken out. The heat-treated product was subjected to primary sorting using a sieve having a mesh size of 0.5 mm and separated into a heat-treated product (on the sieve) and a powder (mainly calcium hydroxide: below the sieve).

The heat-treated product (on the sieve) was crushed with a cutter mill which was set with a screen with a mesh of 8 mm. This crushed product was separated by blown air sorting and sieving (mesh size: W0.8 mm×L10 mm) into a copper wire and resin particles.

The results are shown in Table 2 (Sample 11). The weight reduction rate (Z) in the table is a value obtained by Equation [2].

The resin-peeling rate (Y) in the table is a value obtained by Equation [3].

The weight (C) of the WH before the heat treatment and the weight (D) of the heat-treated product recovered after the heat treatment were measured using an electronic balance.

The resin weight (L) of the WH after the heat treatment was determined by subtracting the copper wire weight determined by the copper wire diameter from the weight of the WH after the heat treatment measured using an electronic balance.

The resin weight (M) recovered after physical sorting was measured using an electronic balance.

The Sample 12 in Table 2 was subjected to a heat treatment, a crushing treatment, and physically sorted in the same manner as Sample 11 except that the heating atmosphere was nitrogen gas. The results are shown in Table 2.

Sample 13 in Table 2 was subjected to a superheating treatment, a crushing treatment, and physically sorted in the same manner as Sample 11 except that the heating atmosphere was an air atmosphere. The results are shown in Table 2.

TABLE 1

| No. | Coated wire (kg) | Ca(OH)$_2$ (kg) | Heating temperature (° C.) | Atmosphere | Resin-peeling rate Y (%) | Resin volatilization rate X (%) |
|---|---|---|---|---|---|---|
| 1 | 1.5 | 0.5 | 220 | Superheated steam | 94 | 7.3 |
| 2 | 1.5 | 0.5 | 180 | Superheated steam | 81 | 2.6 |
| 3 | 1.5 | 0.5 | 250 | Superheated steam | 98 | 9.0 |
| 4 | 1.5 | 0.3 | 220 | Superheated steam | 83 | 6.9 |
| 5 | 1.5 | 1.0 | 220 | Superheated steam | 96 | 7.5 |
| 6 | 1.5 | 0.5 | 220 | Nitrogen | 82 | 5.4 |
| 7 | 1.5 | 0.5 | 150 | Superheated steam | 12 | 0.44 |
| 8 | 1.5 | 0.5 | 300 | Superheated steam | 98 | 15 |
| 9 | 1.5 | None | 220 | Superheated steam | 53 | 5.0 |

(Note)
Nos. 1 to 6 are Examples, Nos. 7 to 9 are Comparative Samples

Sample 14 in Table 2 was subjected to a heat treatment, a crushing treatment, and physically sorted in the same manner as Sample 11 except that the added amount of calcium hydroxide was as shown in Table 2. The results are shown in Table 2.

Sample 15 and Sample 16 in Table 2 were subjected to a heat treatment, a crushing treatment, and physically sorted in the same manner as Sample 11 except that the heating time was the time shown in Table 2. The results are shown in Table 2.

Sample 17 to Sample 19 in Table 2 were subjected to a heat treatment, a crushing treatment, and physically sorted in the same manner as Sample 11 except that the heating temperature was the temperature shown in Table 2. The results are shown in Table 2.

Sample 20 in Table 2 was subjected to a heat treatment, a crushing treatment, and physically sorted in the same manner as Sample 11 except that calcium carbonate ($CaCO_3$) was used as the alkaline powder. The results are shown in Table 2.

Sample B1 and Sample B2 in Table 2 were subjected to a heat treatment, a crushing treatment, and physically sorted in the same manner as Sample 11 except that the heating temperature was the temperature shown in Table 2. The results are shown in Table 2.

Sample B3 in Table 2 was subjected to a heat treatment, a crushing treatment, and physically sorted in the same manner as Sample 11 except that no alkali was added. The results are shown in Table 2. Since the softened and melted resin of Sample B3 was fixed on the inner wall of the rotary kiln, it was difficult to recover the heat-treated product.

As shown in Sample 11 to Sample 20, when the coated wire is subjected to a heat treatment at 200° C. to 250° C. in coexistence with an alkali (calcium hydroxide or calcium carbonate), the resin-peeling rate is 93.4% to 99.5% and it is possible to peel off the majority of the coating resin. In addition, the weight reduction rate is 6.7% or lower and there is almost no resin loss due to the pyrolysis gas.

In addition, as shown in Samples 11 to 13, it is possible to sufficiently separate the coating resin in any of superheated steam, a nitrogen atmosphere, and an air atmosphere. Furthermore, as shown in Samples 11 to 14, it is possible to sufficiently separate the coating resin by adding ⅒ by weight to ⅓ by weight of calcium hydroxide with respect to the coated wire. As shown in Sample 11 to Sample 19, it is possible to sufficiently separate the coating resin by heating at a heating temperature of 200° C. to 250° C. for 30 to 120 minutes. In addition, as shown in Sample 20, it is possible to sufficiently separate the coating resin even in a case where calcium carbonate is used as the alkali.

On the other hand, as shown in Sample B1, when the heating temperature is 170° C., the resin-peeling rate is as low as 78.1% and the resin does not peel off sufficiently. In addition, as shown in Sample B2, when the heating temperature is 300° C., the weight reduction rate is 13.9% and the amount of pyrolysis gas generated is large, thus, the resin loss is large. Furthermore, as shown in Sample B3, when the coated wire is heated without adding alkali, the resin-peeling rate is as low as 78.4% and the resin is not sufficiently peeled. In addition, there is a problem in that the softened and melted resin is fixed on the inner wall of the rotary kiln.

In this manner, it is possible to significantly promote the peeling of the coating resin by heating while applying a physical impact at a temperature of 200° C. to 250° C. in coexistence with an alkali.

Comparative Example 1

The same WH as Sample 11 was not subjected to a heat treatment and was crushed with a cutter mill which was set with a screen with a mesh of 8 mm. This crushed product was separated by blown air sorting and sieving (mesh size: W0.8 mm×L10 mm) into a copper wire and resin particles. As a result, the resin-peeling rate was 79.8% and the resin was not sufficiently peeled off.

TABLE 2

| Sample No. | Raw material weight [kg] | | | | Heating conditions | | | Weight reduction rate [%] | Resin-peeling rate [%] |
| --- | --- | --- | --- | --- | --- | --- | --- | --- | --- |
| | Total | WH | Ca(OH)$_2$ | CaCO$_3$ | Temperature [° C.] | Time [min] | Atmosphere | | |
| 11 | 2.0 | 1.5 | 0.5 | — | 220 | 60 | Superheated steam | 6.1 | 99.1 |
| 12 | 2.0 | 1.5 | 0.5 | — | 220 | 60 | Nitrogen | 2.3 | 96.8 |
| 13 | 2.0 | 1.5 | 0.5 | — | 220 | 60 | Air atmosphere | 3.4 | 99.0 |
| 14 | 2.0 | 1.5 | 0.3 | — | 220 | 60 | Superheated steam | 5.5 | 98.5 |
| 15 | 2.0 | 1.5 | 0.5 | — | 220 | 30 | Superheated steam | 2.6 | 93.6 |
| 16 | 2.0 | 1.5 | 0.5 | — | 220 | 120 | Superheated steam | 6.7 | 99.5 |
| 17 | 2.0 | 1.5 | 0.5 | — | 200 | 60 | Superheated steam | 3.6 | 93.4 |
| 18 | 2.0 | 1.5 | 0.5 | — | 240 | 60 | Superheated steam | 5.9 | 99.2 |
| 19 | 2.0 | 1.5 | 0.5 | — | 250 | 60 | Superheated steam | 6.5 | 99.2 |
| 20 | 2.0 | 1.5 | — | 0.5 | 220 | 60 | Superheated steam | 3.8 | 96.0 |
| B1 | 2.0 | 1.5 | 0.5 | — | 170 | 60 | Superheated steam | 1.7 | 78.1 |

TABLE 2-continued

| Sample No. | Raw material weight [kg] | | | | Heating conditions | | | Weight reduction rate [%] | Resin-peeling rate [%] |
|---|---|---|---|---|---|---|---|---|---|
| | Total | WH | Ca(OH)$_2$ | CaCO$_3$ | Temperature [° C.] | Time [min] | Atmosphere | | |
| B2 | 2.0 | 1.5 | 0.5 | — | 300 | 60 | Superheated steam | 13.9 | 99.4 |
| B3 | 1.5 | 1.5 | — | — | 220 | 60 | Superheated steam | 4.9 | 78.4 |

(Note)
Samples 11 to 20 are Examples, Samples B1 to B3 are Comparative Samples

INDUSTRIAL APPLICABILITY

In the treatment method of a coated wire of the present invention, not only it is possible to recover a metal, such as copper, used as the metal wire of a coated wire without oxidation, but it is also possible to reduce the amount of gas generated during the treatment and to efficiently recover the metal wire of the coated wire.

What is claimed is:

1. A treatment method of a coated wire, the method comprising:
    subjecting a coated wire, in which a metal wire is coated with a resin including plasticizers, to low-temperature heating in a non-combustion atmosphere in coexistence with an alkali to embrittle the coating resin,
    crushing the embrittled coating resin, and
    separating the coating resin and the metal wire, wherein a temperature of the low-temperature heating is 180° C. to 270° C., and
    in subjecting the coated wire to the low-temperature heating in the non-combustion atmosphere in coexistence with the alkali, the plasticizers are decomposed by the alkali.

2. The treatment method of a coated wire according to claim 1,
    wherein the non-combustion atmosphere is a superheated steam atmosphere, a nitrogen atmosphere, a carbon dioxide gas atmosphere, a mixed atmosphere thereof, or an air atmosphere.

3. The treatment method of a coated wire according to claim 1,
    wherein the low-temperature heating and crushing of the coated wire are performed simultaneously.

4. The treatment method of a coated wire according to claim 1,
    wherein, using a heating furnace having a crushing member in the furnace, the coated wire is subjected to the low-temperature heating to simultaneously embrittle and crush the coating resin, the heating furnace is a rotary kiln having a lifter or a stirring blade, and
    the crushing member is a ball or a rod made of ceramics or a metal.

* * * * *